(12) United States Patent
Chang

(10) Patent No.: US 6,412,039 B1
(45) Date of Patent: Jun. 25, 2002

(54) CROSS-BANK, CROSS-PAGE DATA ACCESSING AND CONTROLLING SYSTEM

(75) Inventor: Nai-Shung Chang, Taipei Hsien (TW)

(73) Assignee: Via Technologies, Inc., Taipei Hsien (TW)

( * ) Notice: Subject to any disclaimer, the term of this patent is extended or adjusted under 35 U.S.C. 154(b) by 0 days.

(21) Appl. No.: 09/394,262

(22) Filed: Sep. 10, 1999

(30) Foreign Application Priority Data

Jan. 8, 1999 (TW) ........................................ 88100242 A

(51) Int. Cl.$^7$ .............................................. G06F 12/00
(52) U.S. Cl. ............................ 711/5; 711/201; 711/127; 711/157
(58) Field of Search ............................. 711/5, 201, 127, 711/157

(56) References Cited

U.S. PATENT DOCUMENTS 5,793,663 A * 8/1998 Ng et al. ..................... 365/49
6,072,745 A * 6/2000 Ng et al. ................ 365/230.03
6,219,765 B1 * 4/2001 Jeddeloh ..................... 711/154

* cited by examiner

Primary Examiner—Do Hyun Yoo
Assistant Examiner—Mehdi Namazi
(74) Attorney, Agent, or Firm—Jiawei Huang; J.C. Patents

(57) ABSTRACT

A cross memory bank, cross memory page data accessing and controlling unit that provides more efficient transfer of data between a CPU and a memory cluster is described. The data accessing and controlling unit comprises a CPU interface circuit and a memory controlling circuit. When the CPU submits consecutive data access requests to the CPU interface circuit for accessing memory, addresses of the requested data do not necessarily lie in the same memory bank or the same memory page of the memory cluster. If the requested data lie on a different page or a different bank, the CPU interface circuit sends out cross-bank or cross-page signals to the memory controlling circuit in addition to the internal data request signal. Therefore, the required page in the memory bank can be opened in advance. Consequently, time for memory access is shortened and overall efficiency of the system can be improved.

8 Claims, 15 Drawing Sheets

US 6,412,039 B1

CROSS-BANK, CROSS-PAGE DATA ACCESSING AND CONTROLLING SYSTEM

CROSS-REFERENCE TO RELATED APPLICATION

This application claims the priority benefit of Taiwan application serial no. 88100242, filed Jan. 8, 1999, the full disclosure of which is incorporated herein by reference.

BACKGROUND OF THE INVENTION

1. Field of Invention

The present invention relates to a memory accessing system and controlling method. More particularly, the present invention relates to a memory accessing and controlling system capable of shortening cross-bank and cross-page data access for a central processing unit (CPU).

2. Description of Related Art

Due to the rapid progress in computer technology, the operating speeds of most computer systems are very fast. Aside from a general increase in the working frequency of a CPU, the efficiency of other associated components inside a computer also increase correspondingly. For example, the accessing rate of a main memory such as a dynamic access memory (DRAM) in a computer system has increased. Furthermore, the method of memory control has also improved tremendously. Fast page mode (FPM) and extended data out (EDO) mode of operation have been developed from the earlier version of DRAM control. Now, the most popular memory control methods is the synchronized DRAM (SDRAM).

FIG. 1 is a block diagram showing a computer system having a conventional data accessing and controlling unit. The computer system includes a CPU 110, a data accessing and controlling unit 120 and a memory cluster 130. Through the data accessing and controlling unit 120, the CPU 110 is able to access the memory cluster 130. One end of the data accessing and controlling unit 120 has a few signaling lines that couple with the CPU 110. Similarly, the other end of the data accessing and controlling unit 120 has a few signaling lines that couple with the memory cluster 130. The memory cluster 130 itself contains a plurality of memory banks. In FIG. 1, for example, there are altogether four memory banks 140~143. In addition, each memory bank is further subdivided into a multiple of memory pages. For example, there are a few memory pages 150 within the memory bank 140 and the same number of memory pages in other memory banks as well. Furthermore, these memory banks may be divided into groups with each group enclosed within a memory module. In FIG. 1, memory banks 140 and 141 belong to a first memory module 131 whereas memory banks 142 and 143 belong to a second memory module 132.

The CPU 110 needs to access data in the memory cluster 130 through the data accessing and controlling unit 120. Therefore, the unit 120 must be able to receive a request signal from the CPU 110 and then produce appropriate controlling signals to the memory cluster 130. Otherwise, the CPU 110 is unable to write into or retrieve from the memory cluster 130.

The data accessing and controlling unit 120 is further divided into a CPU interface circuit 121 and a memory controlling circuit 122. The CPU interface circuit 121 is responsible for processing the signals coming from and transmitting to the CPU 110. When the CPU 110 needs to access the memory cluster 130, a data request signal is sent from the CPU 110 to the CPU interface circuit 121. Next, a signal is sent from the CPU interface circuit 121 to the memory controlling circuit 122. Finally, a signal is sent from the memory controlling circuit 122 to the memory cluster 130. Consequently, data from the CPU 110 can be written into the memory cluster 130 or data can be read from the memory cluster 130 by the CPU 110.

Signal lines that link the CPU interface circuit 121 with the CPU 110 include ADS, REQ, HITM, HD, DRDY and DBSY. A signal on the ADS line comes from the CPU 110. A low voltage in the ADS line represents that a request signal is to be sent out by the CPU 110 to access data. Then a signal on the REQ line is sent by the CPU 110 to request reading from or writing to the memory cluster 130. A signal on the HITM line represents that data stored in a cache memory (not shown) of the CPU 110 are to be written back to the memory cluster 130. Signals DRDY and DBSY are data ready and data busy signals, respectively. Both the DRDY and the DBSY signals are sent by the CPU interface circuit 121 to the CPU 110. When the DRDY and the DBSY lines are both at low potential, data are desired to be sent to the CPU 110 through the HD lines.

Signal lines that link the CPU interface circuit 121 with the memory controlling circuit 122 include DADS and DAT. A signal on the DADS line reciprocates the signal produced by the ADS signal from the CPU 110. The DAT lines are just data lines.

Signal lines that link the memory controlling circuit 122 with the memory cluster 130 include CS0~CS3, CMDBK0, CMBDK1 and MD. The signal lines CS0~CS3 are lines for selecting a particular memory bank from the memory banks 140~143. The signals CMDBK0 and CMDBK1 are instructions to memory modules 131 and 132, respectively. The MD lines are just data lines.

In general, depending on the user, different amounts of memory is installed in different computer systems. As a computer system is cold-started, the memory-controlling circuits initiate a series of steps checking the quantity of memory within the system and then retain a record of the memory status. For example, the address of each memory bank or memory page is recorded. Hence, if a particular piece of data that the CPU wants to access resides in a different memory page, the memory controlling circuit is able to issue related instructions for opening up the required page.

Since a record of the memory state is only kept in the memory controlling circuit, when the memory controlling circuit is controlling the memory, the next accessing operation is carried out only after the former accessing operation is completed. Therefore, the memory access rate is lower when cross memory page or cross memory bank data are required by the CPU.

In light of the foregoing, there is a need to provide a memory accessing and controlling system capable of shortening cross memory bank and cross memory page data access for a CPU.

SUMMARY OF THE INVENTION

Accordingly, the purpose of the present invention is to provide a data accessing and controlling unit capable of shortening a latency period for cross memory bank and cross memory page data access, thereby increasing overall efficiency of the system.

To achieve these and other advantages and in accordance with the purpose of the invention, as embodied and broadly described herein, the invention provides a data accessing and controlling unit capable of cross-bank and cross-page data access. The system is coupled to a CPU and a memory cluster. The memory cluster includes a plurality of memory banks with each memory bank having a plurality of pages. The CPU accesses data in the memory cluster through the data accessing and controlling unit. Internally, the data accessing and controlling unit can be further divided into a CPU interface circuit and a memory controlling circuit.

The CPU interface circuit is coupled to the CPU and the memory controlling circuit, and the memory controlling circuit is coupled to the memory cluster.

Operation of the data accessing and controlling unit is as follows. First, when the CPU sends out a data access request, an internal data access request is accordingly submitted by the CPU interface circuit to the memory controlling circuit. When the addresses of consecutive data access requests issued by the CPU are from different memory banks, a cross memory bank signal is also emitted by the CPU interface circuit along with the internal access request. Furthermore, when the addresses of consecutive data access requested by the CPU are from the same memory bank but a different memory page, a cross memory page signal is also emitted by the CPU interface circuit in addition to the internal data access request. The access request can be a request for reading data from the memory cluster or writing data to the memory cluster.

In the subsequent step, the memory controlling circuit acts according to the internal access request signals issued by the CPU interface circuit. When the memory controlling circuit receives both an internal access request signal and a cross memory bank or cross memory page signal, the memory page specifically addressed is opened immediately.

According to one preferred embodiment of this invention, the data accessing and controlling unit further includes an address register for storing the address data of various memory banks and memory pages. The CPU interface circuit sends out a cross memory bank or a cross memory page signal depending on the address data stored in the register. The address data inside the address register is constantly updated by monitoring the operations of the memory controlling circuit on the memory cluster.

In addition, the address register can reside within the CPU interface circuit.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIGS. 6A to 10A are timing diagrams of a conventional data accessing and controlling unit under various operating conditions; and FIGS. 6B to 10B are timing diagrams of the accessing and controlling system under the same operating conditions as described in FIGS. 6A to 10A so that a comparison between two can be made.

DESCRIPTION OF THE PREFERRED EMBODIMENTS

Figure 1:
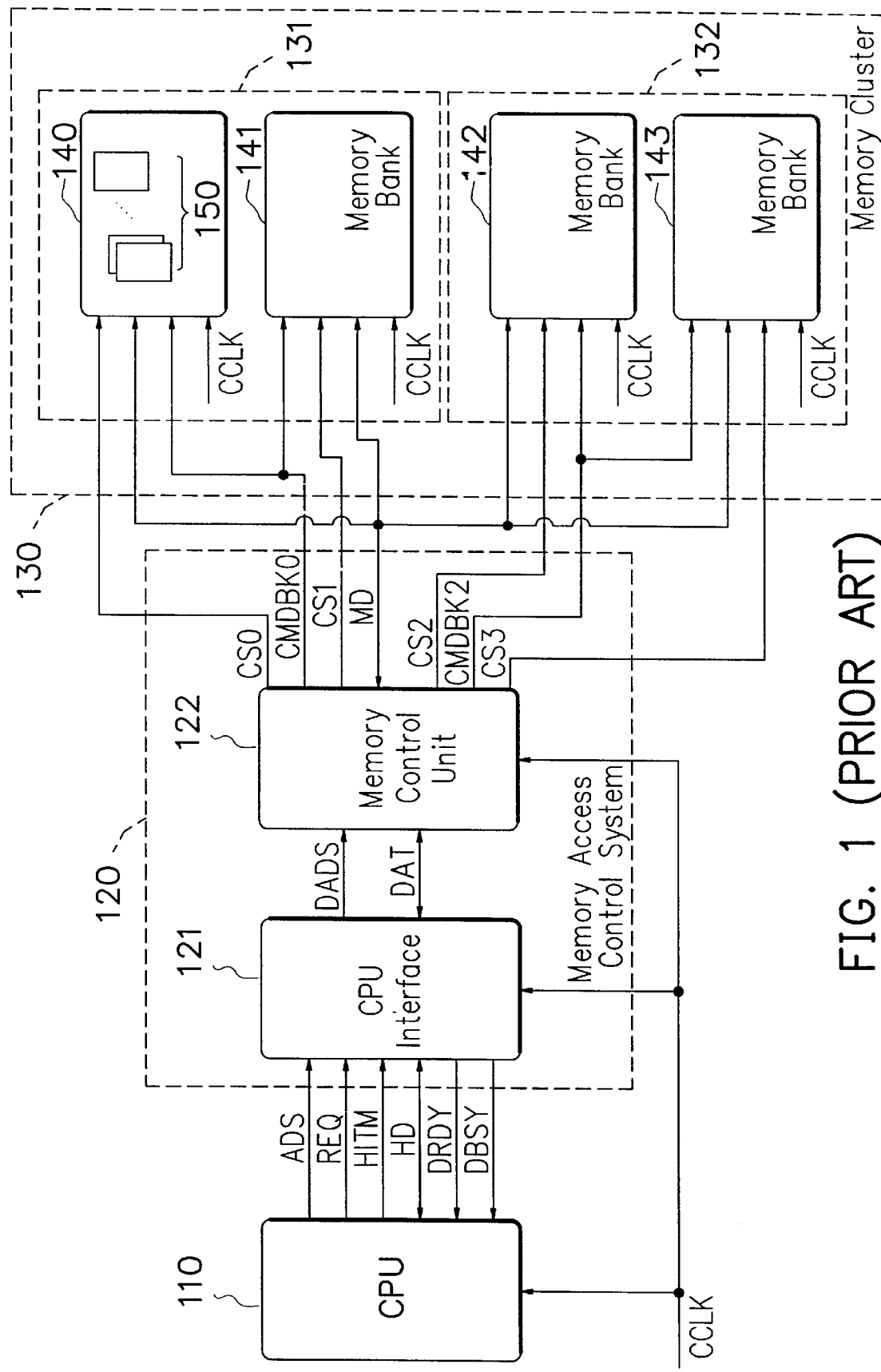
FIG. 1 is a block diagram showing a computer system having a conventional data accessing and controlling unit.

Reference now be made in detail to the present preferred embodiments of the invention, examples of which are illustrated in the accompanying drawings. Wherever possible, the same reference numbers are used in the drawings and the description to refer to the same or like parts.

Figure 2:
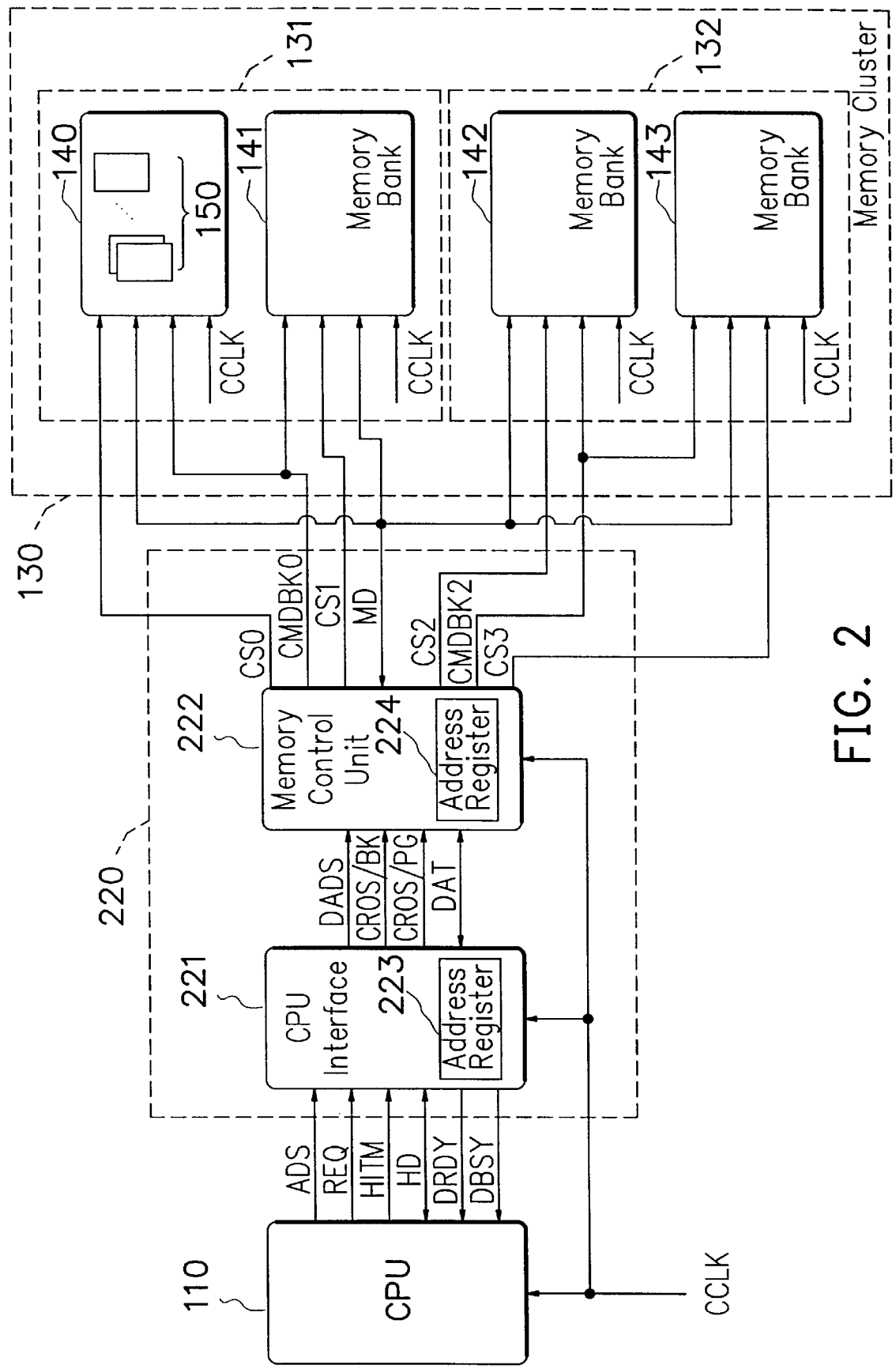
FIG. 2 is a block diagram showing a computer system having a data accessing and controlling unit capable of cross memory page and cross memory bank data access according to this invention.

FIG. 2 is a block diagram showing a computer system having a data accessing and controlling unit capable of cross memory page and cross memory bank data access according to this invention.

As shown in FIG. 2, the CPU and the memory cluster are identical to the one in FIG. 1. Hence, elements within those regions are labeled identically. At one end of the data accessing and controlling unit 220, a plurality of signal lines is coupled to a CPU 110. At the other end, a plurality of signal lines is also coupled to a memory cluster 130. The memory cluster 130 contains a few memory banks. In FIG. 2, there are altogether four memory banks 140~143.

Furthermore, each memory bank has a few memory pages. For example, there are a few memory pages 150 within the memory bank 140. The same number of memory pages is inside other memory banks as well. For clarity, however, memory pages inside memory banks 141, to 143 are omitted in FIG. 2. At present, the amount memory installed in a system is counted in terms of the number of memory modules. Most memories are generally classified as belonging to the dual-in-line memory modules (DIMMs) or the single-in-line memory modules (SIMMs). Each DIMM has two memory banks, whereas each SIMM has only a single memory bank. As shown in FIG. 2, the memory banks 140 and 141 belong to the same memory module 131 while the memory banks 142 and 143 belong to the same memory module 132. However, if the memory modules 131 and 132 are both SIMM, memory banks 141 and 143 are non-existent. In addition, depending on the actual design, the number of memory modules installed within a computer system can be different.

The CPU 110 needs to access data in the memory cluster 130 through the data accessing and controlling unit 220. Therefore, the unit 220 must be able to receive a request signal from the CPU 110 and then send appropriate controlling signals to the memory cluster 130. Otherwise, the CPU 110 is unable to write into or retrieve from the memory cluster 130.

The data accessing and controlling unit 220 is further divided into a CPU interface circuit 221 and a memory controlling circuit 222. The CPU interface circuit 221 is responsible for processing the signals coming from and transmitting to the CPU 110. When the CPU 110 needs to access the memory cluster 130, a data request signal is sent from the CPU 110 to the CPU interface circuit 221. Next, a signal is sent from the CPU interface circuit 221 to the memory controlling circuit 222. Finally, a signal is sent from the memory controlling circuit 222 to the memory cluster 130. Consequently, data from the CPU 110 can be written into the memory cluster 130 or data can be read from the memory cluster 130 by the CPU 110.

Electrical connections between different electronic blocks are achieved through a number of signal lines. In the following, only the signal lines that are related to this invention are indicated. In general, the signal lines mentioned in this invention may be labeled differently in other computer system. In addition, there may be some more signal lines linking up various blocks. However, these signal lines should be familiar to those skilled in the art.

The entire electronic system is synchronized with the clock pulse signal CCLK. Signal lines that link the CPU interface circuit 221 with the CPU 110 include ADS, REQ, HITM, HD, DRDY and DBSY. Depending on actual circuit requirement, each of the signal lines may include more than one signal line. For example, the signal line HD should comprise of a number of data lines. In fact, if the CPU 110 uses a 64-bits architecture, the number of HD lines should be 64. In general, each of these signal lines can be chosen to be either active high or active low. Hence, the following illustration is just one of the many possible examples.

A signal on the ADS line comes from the CPU 110. A low voltage in the ADS line represents that a request signal is to be sent out by the CPU 110. Then a signal on the REQ line is sent by the CPU 110 to request reading from or writing to the memory cluster 130. A signal on the HITM line is also submitted by the CPU 110, specifying whether the addressed data reside in a special cache memory (not shown in the figure) or not. The cache memory can integrate with the CPU 110 as it does in Intel's Pentium II CPU, for example. When the HITM line is at low potential, this represents that data stored in a cache memory (not shown) of the CPU 110 are to be written back to the memory cluster, 130. The cache memory can, for example, be integrated into the CPU 110, such as a Pentium II CPU provided by the Intel company. Signals DRDY and DBSY are data ready and data busy signals, respectively. Both the DRDY and the DBSY signals are sent by the CPU interface circuit 221 to the CPU 110. When the DRDY and the DBSY lines are both at low potential, data on the HD lines are to be sent to the CPU 110.

Signal lines that link the CPU interface circuit 221 with the memory controlling circuit 222 include DADS, CROS/BK, CROS/PG and DAT. A signal on the DADS line reciprocates the signal produced by the ADS signal from the CPU 110. A low potential on the DADS line means that the CPU interface circuit 221 is going to send out an internal data access request to the memory controlling circuit 222. The CROS/BK and the CROS/PG are major aspects in this invention. The issuance of a signal from the CROS/BK signal lines means that the data addresses of a subsequent request and a previous request are in different memory banks. Similarly, the issuance of a signal from the CROS/PG signal lines means that the data addresses of the subsequent request and the previous request are on different memory pages. The DAT lines are just data lines.

Signal lines that link the memory controlling circuit 222 with the memory cluster 130 include CS0~CS3, CMDBK0, CMBDK1 and MD. The signal lines CS0~CS3 are lines for selecting a particular memory bank from the memory banks 140~143. The signals CMDBK0 and CMDBK1 are instructions to memory modules 131 and 132, respectively. The MD lines MD are just data lines.

The CPU interface circuit 221 has an address register 223. Similarly, the controlling memory circuit 222 also has an address register 224. The address registers 223 and 224 are used for storing address data regarding various memory banks and memory pages. In general, a variable number of memory modules are plugged into a computer system depending on the operating requirement. Therefore, the amount of memory banks and pages in the memory cluster 130 may differ from system to system.

When a computer system starts up, information regarding the amount of memory modules already installed and their location relative to the memory cluster 130 can be detected by the memory controlling circuit 222. Information about memory banks and memory pages such as its addresses are then recorded in the address registers 223 and 224. For example, addresses of the memory banks 140~143 and its memory pages are recorded inside the registers 223 and 224.

When the CPU 110 requests some data from the memory cluster 130, a low potential is sent on the signal line ADS. As soon as the CPU interface circuit 221 receives a data request, the CPU interface circuit 221 searches its address register 223 in order to retrieve the address of the previous CPU request. Next, the address of the previous request is compared with the address of the newly arrived request. If the addresses are in different memory banks, a signal is simultaneously sent from the CPU interface circuit 221 to the memory controlling circuit 222 via the signal line CROS/BK as the signal from the signal line DADS is sent. Similarly, if the addresses are on different pages, a signal is simultaneously sent from the CPU interface circuit 221 to the memory controlling circuit 222 via the CROS/PG line as the signal from the signal line DADS is sent. Otherwise, the CROS/BK signal and the CROS/PG signal are inactive.

When the memory controlling circuit 222 receives signals from both the signal lines DADS and CROS/BK, a related controlling instruction is sent to the memory cluster 130 for opening a different memory bank. Alternatively, when the memory controlling circuit 222 receives signals from both the signal lines DADS and CROS/PG, a related controlling instruction is sent to the memory cluster 130 for opening a different memory page within a memory bank. Then the data access action requested by the CPU 110 is accomplished.

Figure 3:
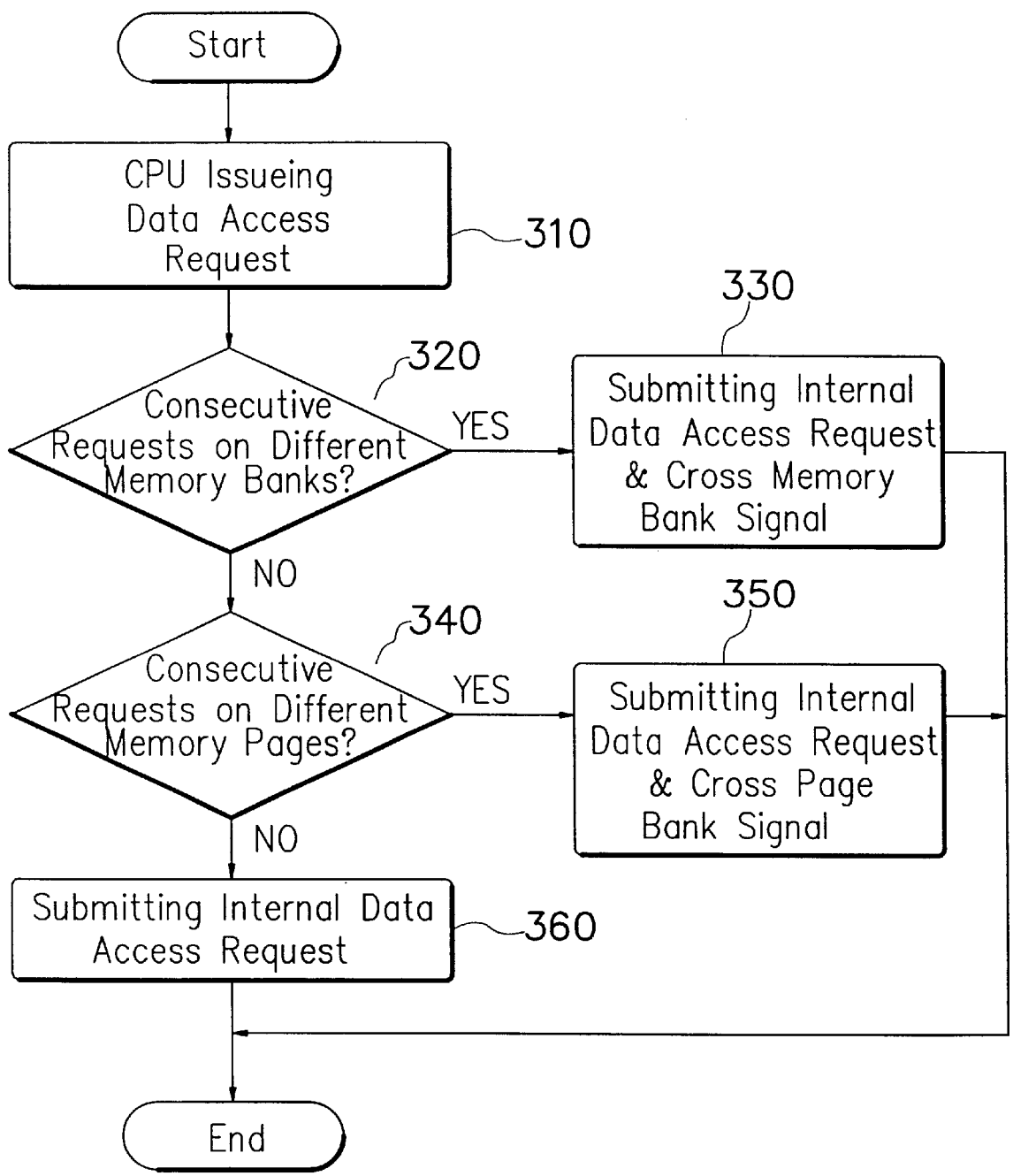
FIG. 3 is a flow chart showing the series of steps carried out by the CPU interface circuit of the data accessing and controlling unit of this invention.

FIG. 3 is a flow chart showing the series of steps carried out by the CPU interface circuit 221 of the data accessing and controlling unit 220 of this invention.

First, in step 310, the CPU interface circuit 221 picks up a data request signal ADS from the CPU 110. Next, in step 320, the address of the present data request is compared with the address of the previous data request retrieved from the address register 223. The present and the previous addresses are compared to see if both are on the same memory bank. If the addresses are found to be in different memory banks, then step 330 is carried out to issue a signal on the signal line DADS as well as a signal on the signal line CROS/BK. The DADS is an internal access request signal while the CROS/BK is a cross memory bank signal; both are sent to the memory controlling circuit 222.

After that, the whole sequence of operations ends. However, if both the present and the previous data request addresses are on the same memory bank, then step 340 is carried out. In step 340, the address of the present data request is compared with the address of the previous data request retrieved from the address register 223. The present and the previous addresses are compared to see if both are on the same memory page. If the addresses are found to be on different memory pages, then step 350 is carried out to issue a signal on the signal line DADS as well as a signal on the signal line CROS/PG. The DADS is an internal access request signal while the CROS/PG is a cross memory page signal, both are sent to the memory controlling circuit 222. Thereafter, the whole sequence of operations is brought to an end. However, if both the present and the previous data request addresses are on the same memory page, then step 360 is carried out. In step 360, only the signal on the signal line DADS is sent to the memory controlling circuit 222. Subsequently, the whole sequence of operations is complete.

Figure 4:
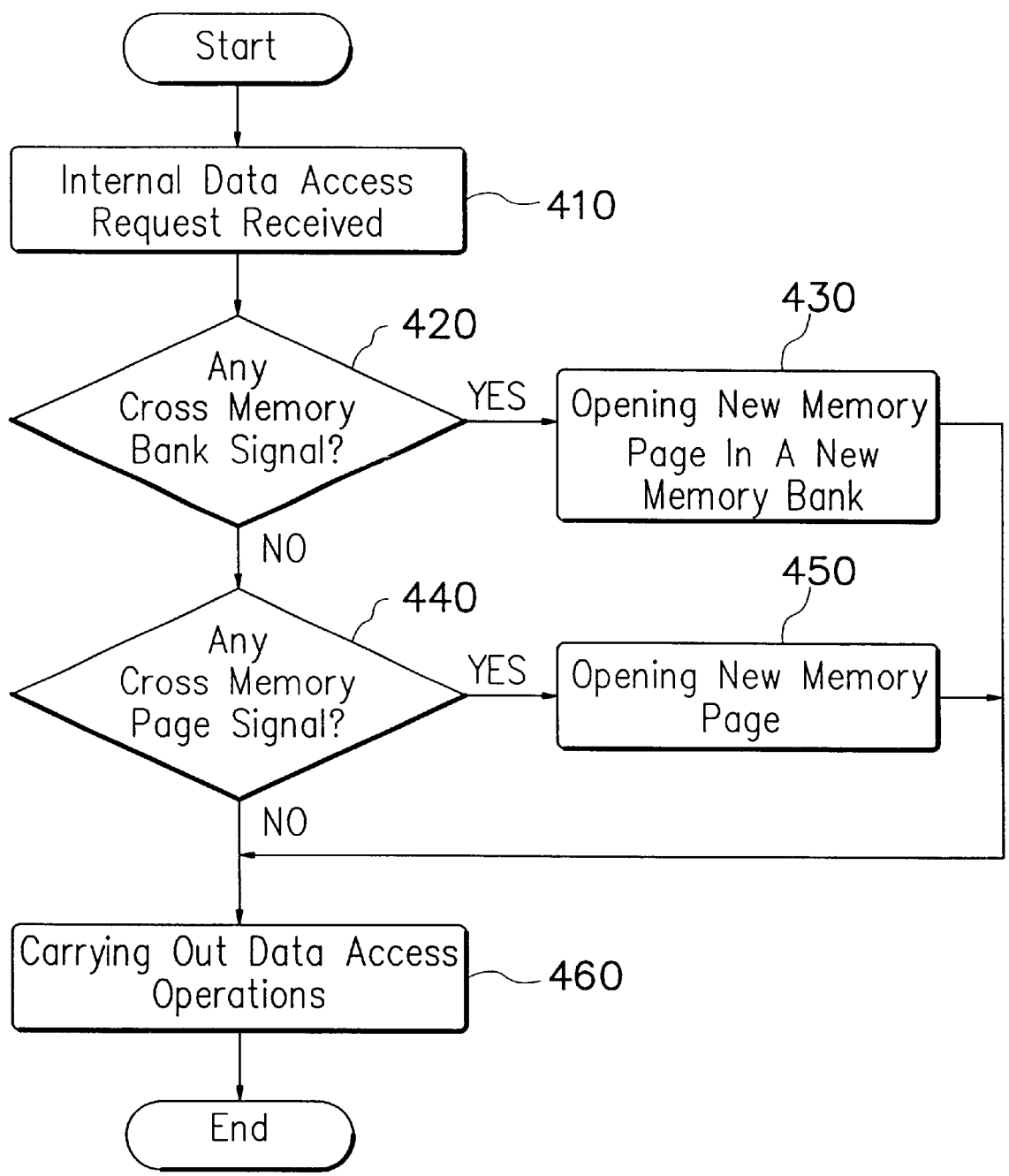
FIG. 4 is a flow chart showing the series of steps carried out by the memory controlling circuit of the data accessing and controlling unit after receiving the internal data request signals from the CPU interface circuit.

FIG. 4 is a flow chart showing the series of steps carried out by the memory controlling circuit 222 of the data accessing and controlling unit 220 after receiving the internal data request signals from the CPU interface circuit 221.

First, in step 410, the memory controlling circuit 222 is activated by the internal data request signals coming from the CPU interface circuit 221. Next, in step 420, the memory controlling circuit 222 checks to see if a CROS/BK signal is present or not. If the CROS/BK signal is also present, then step 430 is carried out to open a new memory page in a new memory bank of the memory cluster 130. Thereafter, step 460 is carried out to access the data in the newly determined memory area in the memory cluster 130.

However, if no CROS/BK signal is received, then step 440 is carried out. In step 440, the memory controlling circuit 222 checks to see if a CROS/PG signal is present or not. If the CROS/PG signal is present, then step 450 is carried out to open a memory page in the memory cluster 130. Subsequently, step 460 is carried out to access the data in the new memory page of the memory cluster 130. Finally, if both the CROS/BK and the CROS/PG signals are absent, that means the requested data are possibly on the same page and in the same memory bank as in the previous request. In that case, step 460 is executed to permit CPU 110 to write data into the memory cluster 130 or to read data from the memory cluster 130.

The above is a general description of the operations of a memory accessing and controlling unit according to this invention. In reality, the CPU interface circuit 221 and the memory controlling circuit 222 of the memory accessing and controlling unit 220 are fabricated on the same piece of silicon chip. For example, the unit is built on a chipset in a personal computer system. Consequently, there is no need to have two address registers, one on the CPU interface circuit and the other on the memory controlling circuit 222. A common address register can be used by both.

Figure 5:
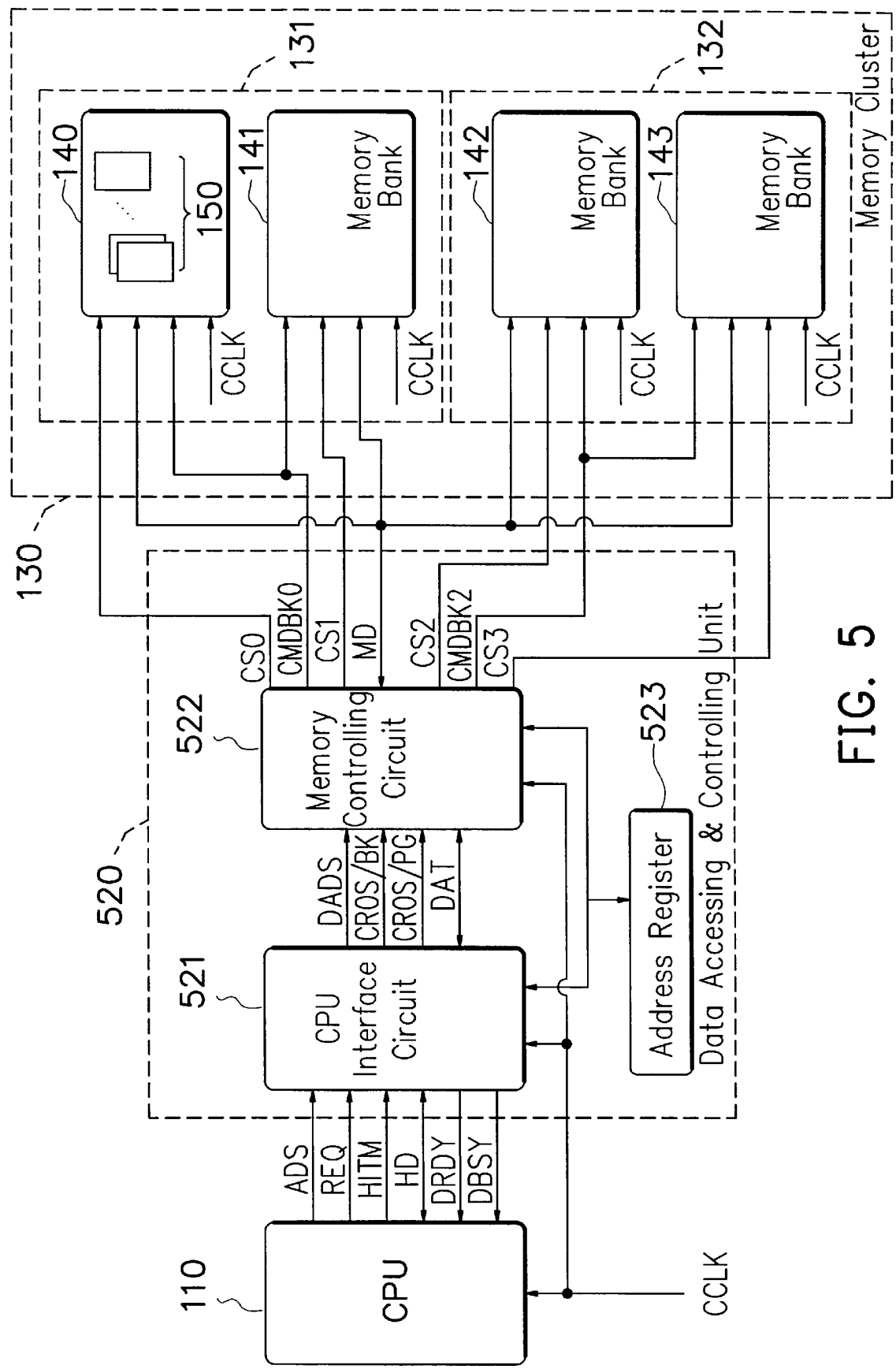
FIG. 5 is a block diagram showing a computer system having a second type of data accessing and controlling unit similarly capable of cross memory page and cross memory bank data access according to this invention.

FIG. 5 is a block diagram showing a computer system having a second type of data accessing and controlling unit similarly capable of cross memory page and cross memory bank data access according to this invention. In FIG. 5, the CPU 110, the memory cluster 130 and most of the interconnecting signal lines are similar to FIG. 2. Hence, identical labels are used whenever the same components are referred to, and detailed description of those components is not repeated below.

As shown in FIG. 5, both the CPU interface circuit 521 and the memory controlling circuit 522 of the data accessing and controlling unit 520 can access the data in the address register 523. When the system is initiated, information regarding the use of memory cluster 130 is extracted by the memory controlling circuit 522 and then stored in the address register 523. When the CPU 110 issues a data request, the CPU interface circuit 521 can decide if the data resides on the same memory bank or same memory page as the previous request through the address information in the address register 523. If the requested data are found to be in different memory banks or different memory pages, the CPU interface circuit 521 sends out a signal to the memory controlling circuit 522 via the signal line CROS/PG or CROS/BK besides the internal data access request. Hence, a new memory page or a new memory bank is opened to meet the demand of the CPU 110.

FIGS. 6A to 10A are timing diagrams of a conventional data accessing and controlling unit under various operating conditions. FIGS. 6B to 10B are timing diagrams of the accessing and controlling system under the same operating conditions as described in FIGS. 6A to 10A so that a comparison between the two can be made. In the given batch of examples, a sequence of three consecutive data read requests is issued by the CPU 110. Furthermore, for each data request, four consecutive sets of data are required to be retrieved from the memory cluster 130, and the memory cluster has a latency period of two cycles. In the following descriptions, the labels in FIG. 2 are used. Although there may be a slight difference in the architecture shown in FIG. 5, the operating sequence is the same as in FIG. 2.

Figure 6A:
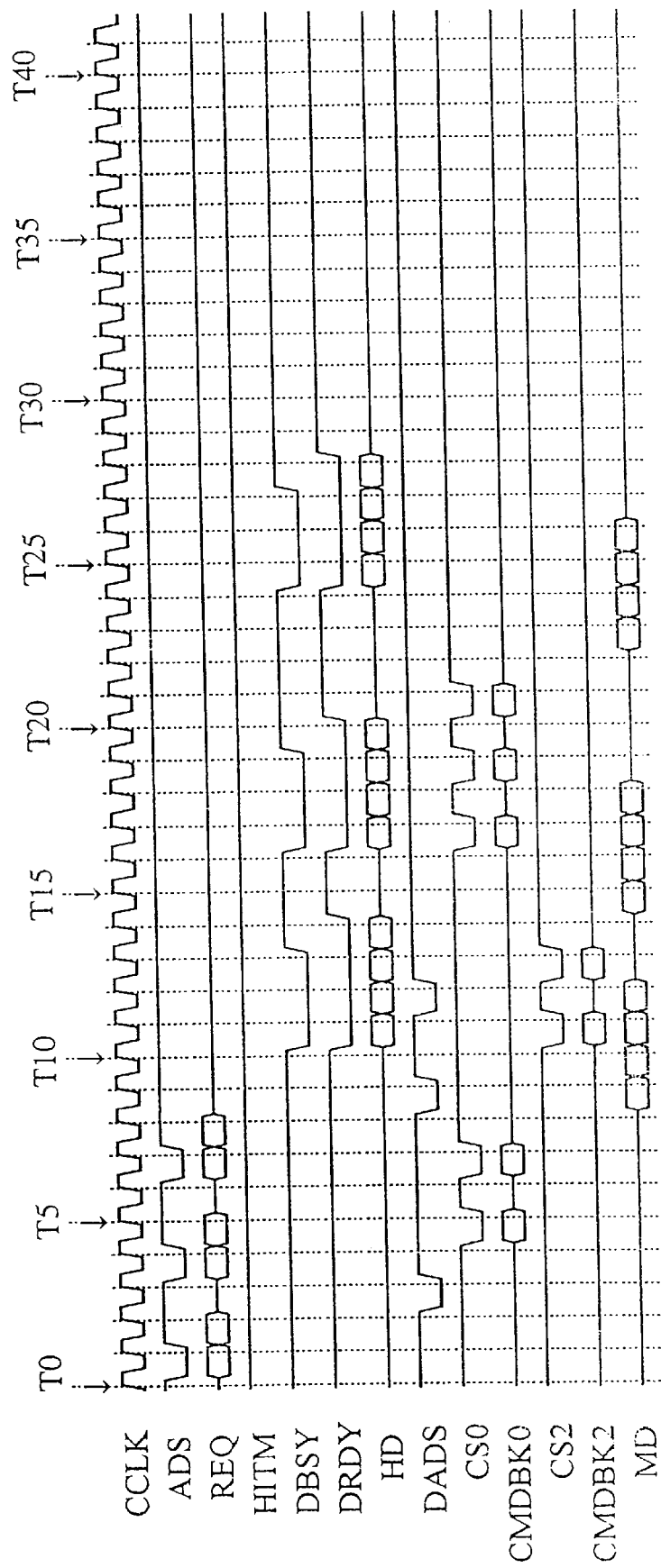
Figure 6B:
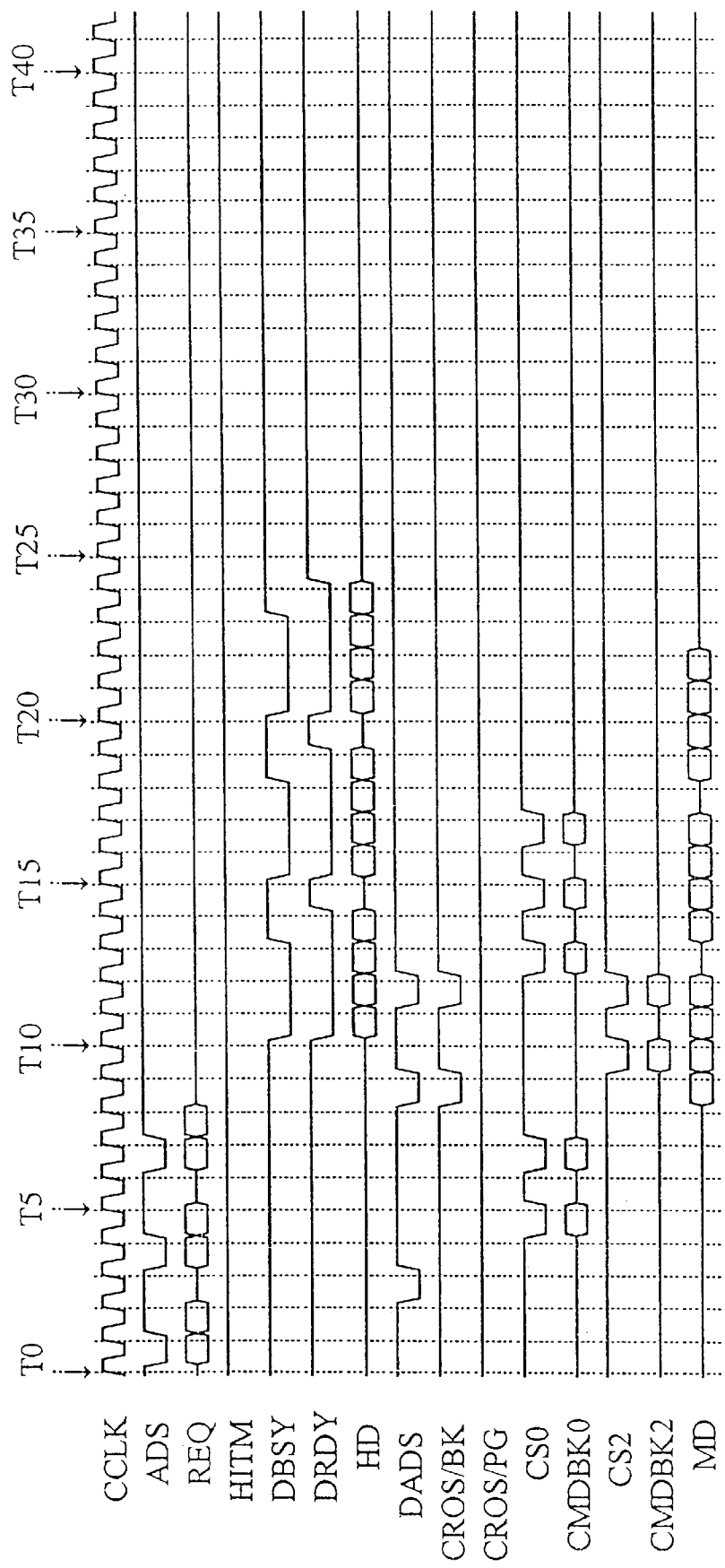

Timing diagrams shown in FIGS. 6A and 6B are waveforms that derive from using SIMMs. In the first data request issued by the CPU 110, the requested data resides in the memory bank 140 on a starting page. Data requested by the second data request of the CPU 110 resides on the starting page of the memory bank 142. Data requested by the third data request of the CPU 110 resides in the same memory bank 140 as in the first request, but this time the requested data are on a different page.

In the conventional timing diagram as shown in FIG. 6A, the CPU 110 sends out ADS and REQ data read signals in cycles T1, T4 and T7, respectively. If the current access request is not a write-back request, the CPU interface circuit 221 waits two cycles after the CPU 110 sending out the first data read signal, and emits an internal data access request signal via the DADS line to the memory controlling circuit 222. After the CPU 110 sends out the second data access request, the CPU interface circuit 221 must wait for some time just to be sure that the HITM signal line is not activated. Hence, the CPU interface circuit 221 does not send a signal down the signal line DADS to the memory controlling circuit 222 until cycle T9 is reached. By a similar argument, the third internal data request does not send a signal down the signal line DADS until cycle T12 is reached.

After the receiving the first data access request from the CPU interface circuit 221, the memory controlling circuit 222 sends out an activating signal and a read instruction to the memory bank 140 via signal lines CS0 and CMDBK0 during cycles T5 and T7. After another two cycles, the memory cluster 130 returns four sets of data, which are requested by the CPU 110, via data lines MD starting in cycle T9.

Although the memory controlling circuit 222 also receives the second data request from the CPU interface circuit 221 during the time cycle T9, in accordance with a general memory access method, an activating signal and a read instruction are not sent to the memory bank 142 via signal lines CS2 and CMDBK2 until the second-to-last set of data is transferred from the memory cluster 130 in, for example, cycle T11. Four more cycles later in cycle T15, the four sets of data required by the second data access request are returned by the memory cluster 130.

Similarly, after the memory controlling circuit 222 receives the third data access request signal from the CPU interface circuit 221, the CS0 and CMDBK0 signal lines does not send forward a pre-charge signal, an activating signal and a read instruction to the memory bank 140 until cycle T17, when the second-to-last set of data is already transferred from the memory cluster 130 to the CPU 110. The CS0 and the CMDBK0 signals trigger the closing of the opened memory page and the opening of a necessary, new memory page. After two more cycles starting in cycle T23, the memory cluster 130 releases the last of four sets of data that correspond to the third data request by the CPU 110.

In the timing diagram as shown in FIG. 6B, the CPU 110 sends out ADS and REQ data read signals in cycles T1, T4 and T7, respectively. If the current access request is not a write-back request, the CPU interface circuit 221 waits two cycles after the CPU 110 sending out the first data access request signal, and emits an internal data access request signal via the signal line DADS to the memory controlling circuit 222. After the CPU 110 sends out the second data access request, the CPU interface circuit 221 must wait for some time just to be sure that the HITM signal line is not activated.

Hence, the CPU interface circuit 221 does not send a signal down the signal line DADS to the memory controlling circuit 222 until cycle T9 is reached. Since the second data access request is on the starting page of memory bank 142, the CPU interface circuit 221 also emits a cross memory bank signal to the memory controlling circuit 222 via the signal line CROS/BK. Similarly, the third data request is sent during cycle T12. Since the requested data now resides on a memory page in the memory bank 140, a signal is also sent on the signal line CROS/BK, as well.

After the receiving the first data access request from the CPU interface circuit 221, the memory controlling circuit 222 sends out an activating signal and a read instruction to the memory bank 140 via signal lines CS0 and CMDBK0 during cycles T5 and T7. After another two cycles, the memory cluster 130 return four sets of data via data lines MD starting in cycle T9.

Data requested by the second data request of the CPU 110 resides in a different memory bank. Hence, as soon as the second data access request is received, an activating signal and a read instruction are submitted to the memory bank 142 via signal lines CS2 and CMDBK2 during the next cycle T10. Starting in cycle T14, four sets of data are returned by the memory cluster 130.

Similarly, the data required by the third data access request resides in another memory bank. Therefore, as soon as the third data access request is received, a pre-charge signal, an activating signal and a read instruction are sent to the memory bank 140 via signal lines CS0 and CMDBK0 during the next cycle T13. After a few more cycles starting in cycle T19, four sets of data are returned by the memory cluster 130.

As shown in FIG. 6A, a conventional data accessing and controlling unit requires a total of 28 clock cycles to complete the entire operation starting from the sending of three consecutive data access requests to the return of all requested data to the CPU 110 via signal lines HD. In comparison, the data accessing and controlling unit of this invention requires only 24 clock cycles as shown in FIG. 6B.

Figure 7A:
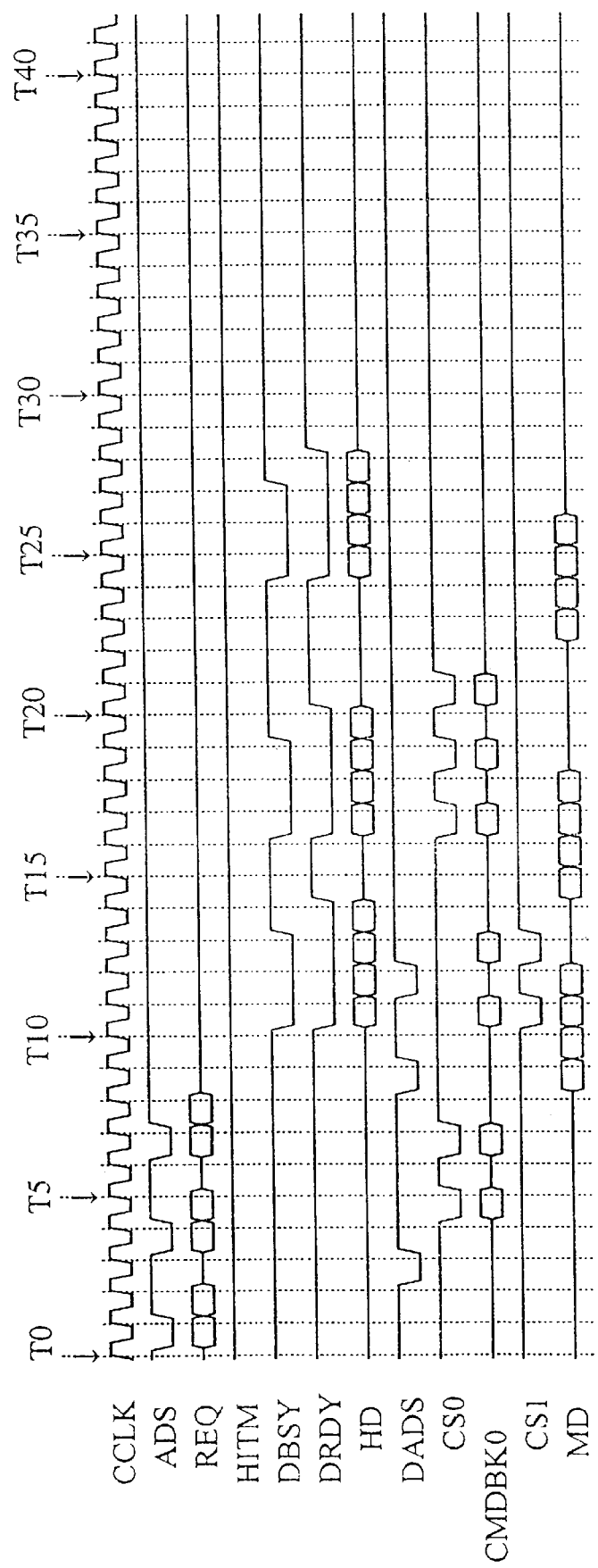
Figure 7B:
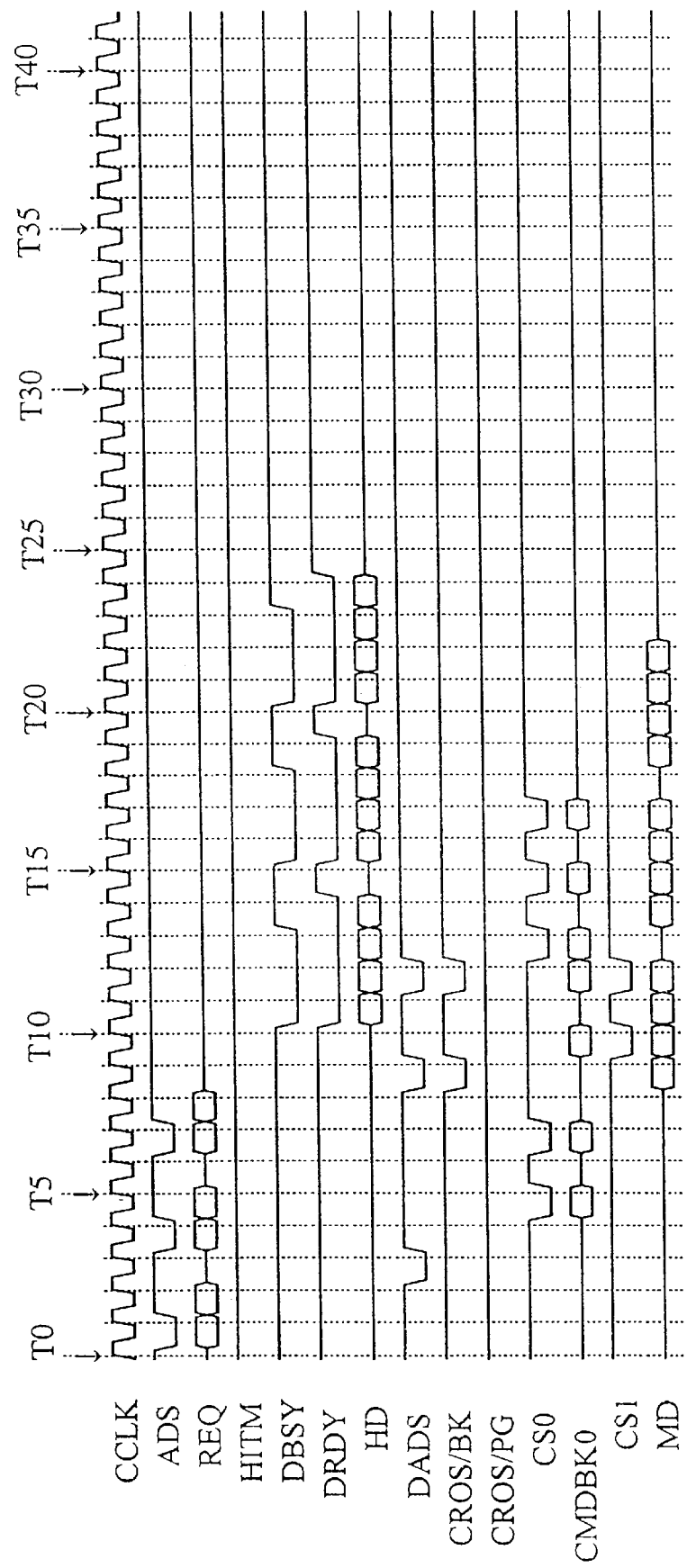

Timing diagrams shown in FIGS. 7A and 7B are waveforms that derive from using DIMMs. The requested data of the first data access request issued by the CPU 110 resides on the starting page of the memory bank 140. Data requested by the second data request of the CPU 110 resides on the starting page of the memory bank 142. Data requested by the third data request of the CPU 110 resides in the same memory bank 140 as in the first request, but this time the requested data are on a different page.

In the conventional timing diagram as shown in FIG. 7A, the CPU 110 sends out ADS and REQ data read signals in cycles T1, T4 and T7, respectively. Two cycles after the CPU 110 sends out the first data read signal, the CPU interface circuit 221 emits an internal data access request signal to the memory controlling circuit 222 via the signal line DADS. After the CPU 110 sends out the second data access request, the CPU interface circuit 221 must wait for some time just to be sure that the HITM signal line is not activated. Hence, the CPU interface circuit 221 does not send a signal down the signal line DADS to the memory controlling circuit 222 until cycle T9 is reached. By a similar argument, the third internal data request does not send a signal down the signal line DADS until cycle T12 is reached.

After receiving the first data access request from the CPU interface circuit 221, the memory controlling circuit 222 sends out an activating signal and a read instruction to the memory bank 140 via signal lines CS0 and CMDBK0 in cycles T5 and T7. After another two cycles, four sets of data are returned by the memory cluster 130 via data lines MD, starting in cycle T9.

Although the memory controlling circuit 222 has already received the second data request from the CPU interface circuit 221 by cycle T9, an activating signal and a read instruction are not sent to the memory bank 141 via signal lines CS1 and CMDBK0 until the second-to-last set of data is transferred from the memory cluster 130 to the CPU 110 in cycle T11. After four more cycles starting in cycle T15, another four sets of data are returned by the memory cluster 130.

Similarly, after the memory controlling circuit 222 picks up the third data access request signal from the CPU interface circuit 221, the CS0 and CMDBK0 signal lines does not send forward a pre-charge signal, an activating signal and a read instruction to memory bank 140 until the second-to-last set of data is transferred from the memory cluster 130 to the CPU 110 in cycle T17. After four more cycles, four sets of data are returned by the memory cluster 130 starting in cycle T23.

In the timing diagram as shown in FIG. 7B, the CPU 110 sends out ADS and REQ data read signals in cycles T1, T4 and T7, respectively. Two cycles after the CPU 110 sends out the first data access request signal, the CPU interface circuit 221 emits an internal data access request signal via the DADS line to the memory controlling circuit 222. After the CPU 110 sends out the second data access request, the CPU interface circuit 221 must wait for some time just to be sure that the HITM signal line is not activated.

Hence, the CPU interface circuit 221 does not send a signal down the signal line DADS to the memory controlling circuit 222 until cycle T9 is reached. Since the data required by the second data access request resides on the starting page of memory bank 141, the CPU interface circuit 221 also submits a cross memory bank signal to the memory controlling circuit 222 via the signal line CROS/BK. By a similar argument, the third internal data request does not send a signal down the signal line DADS until cycle T12 is reached. Since the requested data resides on a memory page in the memory bank 140, a signal has to be sent from the CPU interface circuit 221 to the memory controlling circuit 222 via the signal line CROS/BK, as well.

After receiving the first data access request from the CPU interface circuit 221, the memory controlling circuit 222 sends out an activating signal and a read instruction to the memory bank 140 via signal lines CS0 and CMDBK0 in cycles T5 and T7. After another two cycles, four sets of data are returned by the memory cluster 130 via data lines MD starting in cycle T9.

The data required by the second data access request of the CPU 110 resides in a different memory bank. Hence, as soon as the second data access request is received, an activating signal and a read instruction are issued by the memory controlling circuit 222 to the memory bank 141 via signal lines CS1 and CMDBK0 during the next cycle T10. After a few more cycles starting in cycle T14, four more sets of data are returned by the memory cluster 130.

Similarly, the data required by the CPU 110 in the third data access request resides in another memory bank. Hence, as soon as the third data access request is a pre-charge signal, an activating signal and a read instruction are sent to the memory bank 140 via signal lines CS0 and CMDBK0 in the next cycle T13. After a few more cycles starting in cycle T19, four more sets of data are returned by the memory cluster 130.

As shown in FIG. 7A, a conventional data accessing and controlling unit requires a total of 28 clock cycles to complete the entire operation, from the sending of three consecutive data access requests to the return of all data requested by the CPU 110 via signal lines HD. In comparison, the data accessing and controlling unit of this invention requires only 24 clock cycles as shown in FIG. 7B.

Figure 8A:
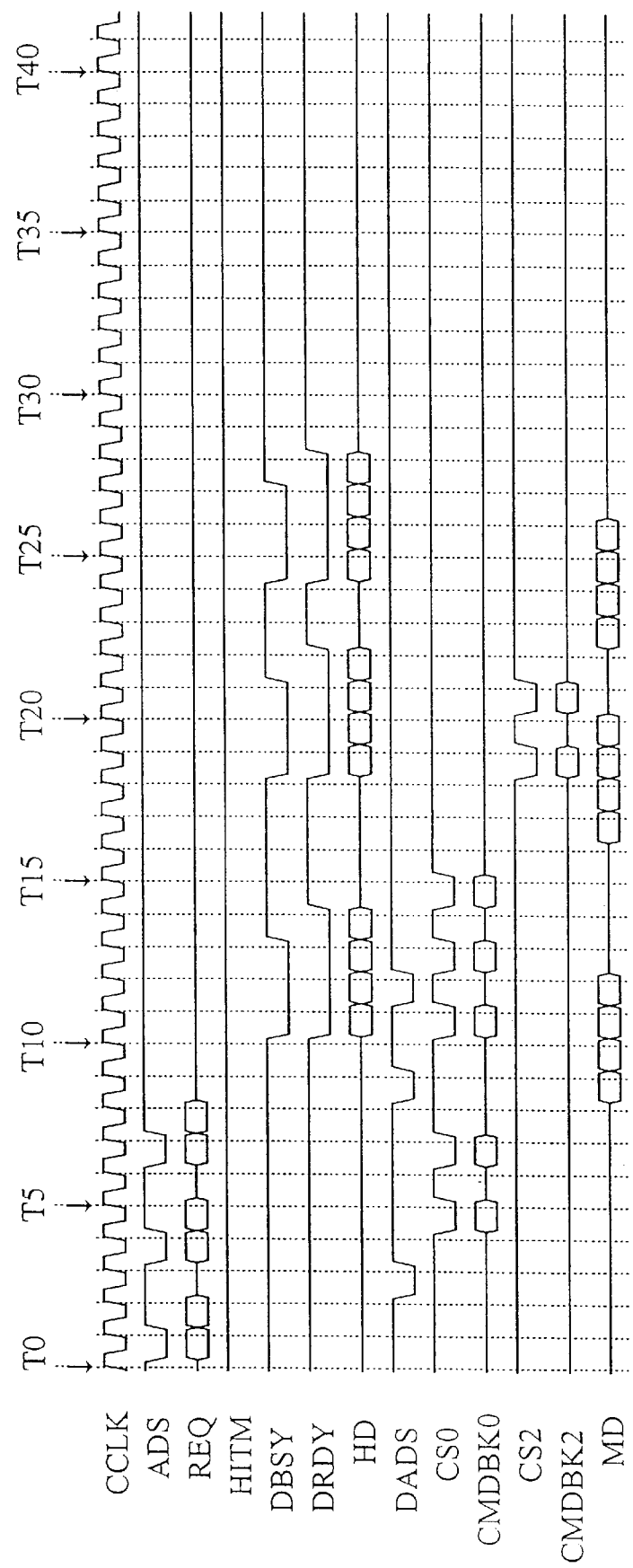
Figure 8B:
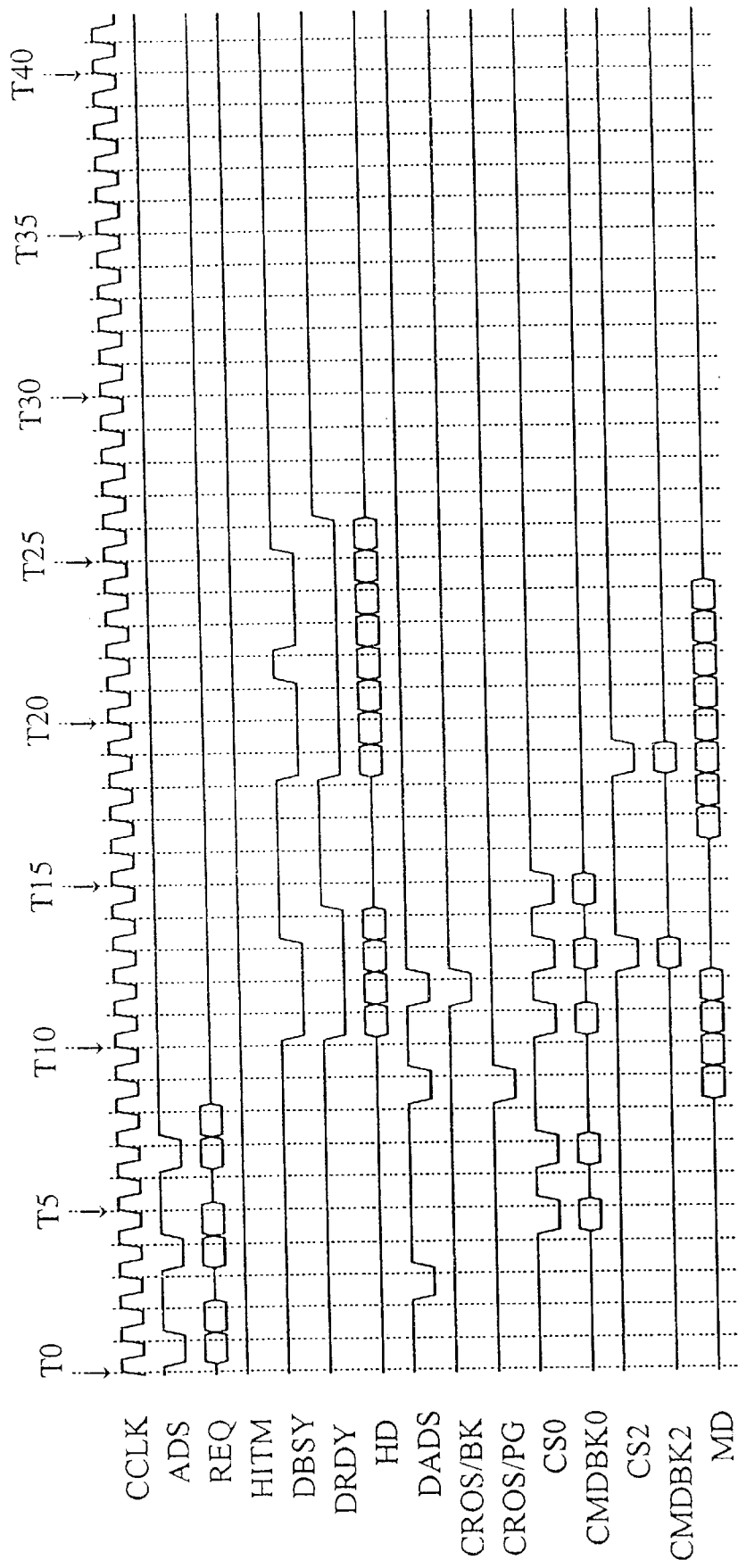

Timing diagrams shown in FIGS. 8A and 8B are waveforms that derive from using SIMMs. In the first data request issued by the CPU 110, the requested data resides on the starting page of the memory bank 140. Data requested by the second data request of the CPU 110 also resides in the same memory bank 140 but on a different memory page. Data requested by the third data request of the CPU 110 resides on the starting page of another memory bank 142.

In the conventional timing diagram shown in FIG. 8A, the CPU 110 sends out ADS and REQ signals in cycles T1, T4 and T7, respectively. If the first data access request signal is not a write-back request signal, two cycles after the CPU 110 sends out the first data access request signal, the CPU interface circuit 121 emits an internal data access request signal to the memory controlling unit 122 via the signal line DADS. After the CPU 110 sends out the second data access request, the CPU interface circuit 121 must wait for some time just to be sure that the HITM signal line is not activated. Hence, the CPU interface circuit 121 does not send a signal down the signal line DADS to the memory controlling circuit 122 until cycle T9 is reached. By a similar argument, the third internal data request does not send a signal down the signal line DADS until cycle T12 is reached.

After receiving the first data access request from the CPU interface circuit 121, the memory controlling circuit 122 sends out an activating signal and a read instruction to the memory bank 140 via signal lines CS0 and CMDBK0 in cycles T5 and T7. After another two cycles, four sets of data are returned by the memory cluster 130 via data lines MD starting in cycle T9.

Although the memory controlling circuit 122 has already received the second data request from the CPU interface circuit 121 by cycle T9, a pre-charging signal, an activating signal and a read instruction are not sent to the memory bank 140 via the signal lines CS0 and CMDBK0 until the second-to-last set of data is transferred from the memory cluster 130 to the CPU 110 in cycle T11. After a few more cycles starting in cycle T17, another four sets of data are returned by the memory cluster 130.

Similarly, after the memory controlling circuit 122 picks up the third data access request signal from the CPU interface circuit 121, signal lines CS2 and CMDBK2 do not send forward a pre-charge signal, an activating signal and a read instruction to memory bank 142 until the second-to-last set of data is transferred from the memory cluster 130 to the CPU 110 in cycle T20. After four more cycles, four sets of data are returned by the memory cluster 130 starting in cycle T24.

In the timing diagram as shown in FIG. 8B, the CPU 110 sends out ADS and REQ data access signals in cycles T1, T4 and T7, respectively. If the first data access request signal is not a write-back request, two cycles after the CPU 110 sends out the first data access request signal, the CPU interface circuit 221 emits an internal data access request signal to the memory controlling circuit 222 via the signal line DADS. After the CPU 110 sends out the second data access request, the CPU interface circuit 221 must wait for some time just to be sure that the HITM signal line is not activated: Hence, the CPU interface circuit 221 does not send a signal down the signal line DADS to the memory controlling circuit 222 until cycle T9 is reached. Although the data required by the second data request resides in the same memory bank 140, the data are on a different page. Hence, a cross memory page signal is produced by the CPU interface circuit 221 and sent through the signal line CROS/PG. By a similar argument, the third internal data request does not send a signal down the signal line DADS until cycle T12 is reached. Since the requested data now resides in a different memory bank 142, a cross memory bank signal has to be submitted via the signal line CROS/BK as well.

After receiving the first data access request from the CPU interface circuit 221, the memory controlling circuit 222 sends,out an activating signal and a read instruction to the memory bank 140 via the signal lines CS0 and CMDBK0 in cycles T5 and T7. After another two cycles, four sets of data are returned by the memory cluster via data lines MD starting in cycle T9.

When the memory controlling circuit 222 processes the first data read request, since different memory pages in the same memory bank needs to be accessed in the second data read request, the memory cluster 130 must wait until the second-to-last set of data is sent out. Therefore, a precharging signal, an activating signal and a read instruction are not sent on the signal lines CS0 and CMDBK0 until cycle T11 is reached. After a few more cycle starting in cycle T17, four more sets of data are returned by the memory cluster 130.

Similarly, the data required by the third data access request resides in another memory bank. Hence, as soon as the third data access request is received, a pre-charge signal, an activating signal and a read instruction are issued by the memory bank 142 via the signal line CS2 and CMDBK2 in the next cycle T13. However, the second data access request has to wait until the start of cycle T19 before the read instruction can be sent to the memory bank 142. After two more cycles starting in cycle T21, four sets of data are returned by the memory cluster 130.

As shown in FIG. 8A, a conventional data accessing and controlling unit requires a total of 28 clock cycles to complete the entire operation, from the sending of three consecutive data access requests to the return of all necessary data to the CPU 110 via signal lines HD. In comparison, the data accessing and controlling unit of this invention requires only 26 clock cycles as shown in FIG. 8B.

Figure 9A:
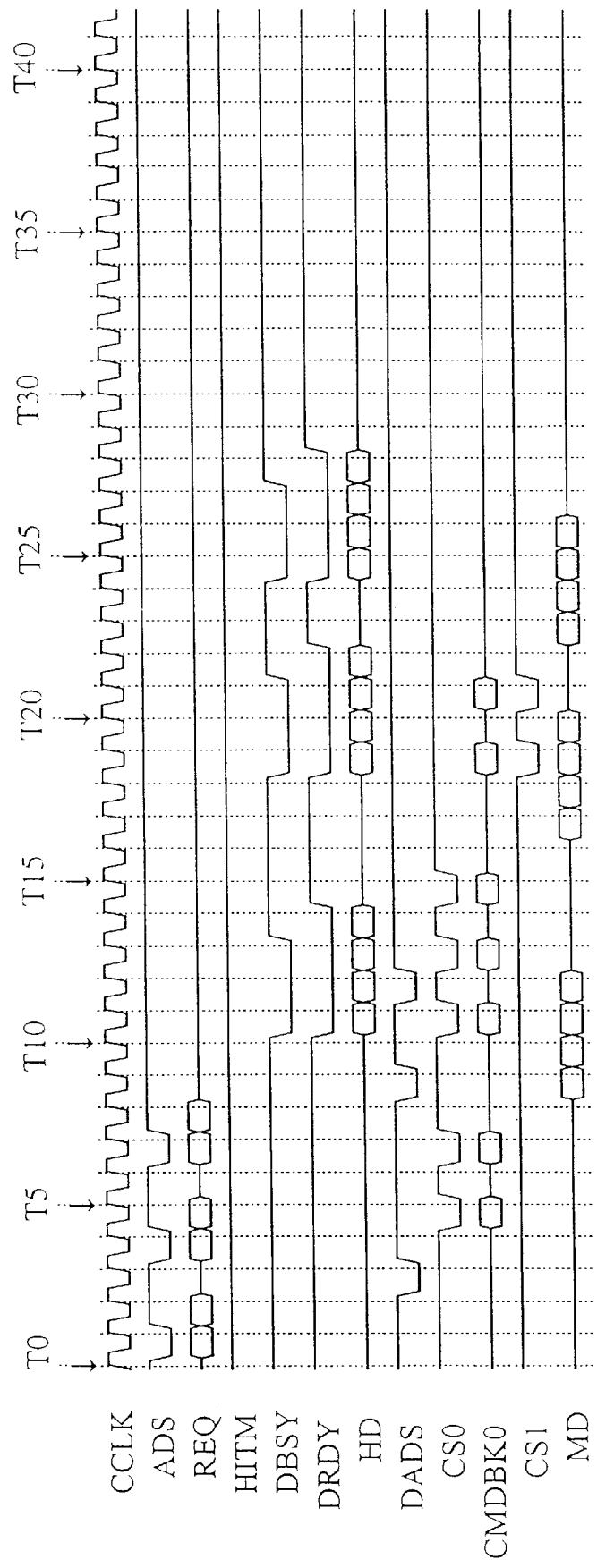
Figure 9B:
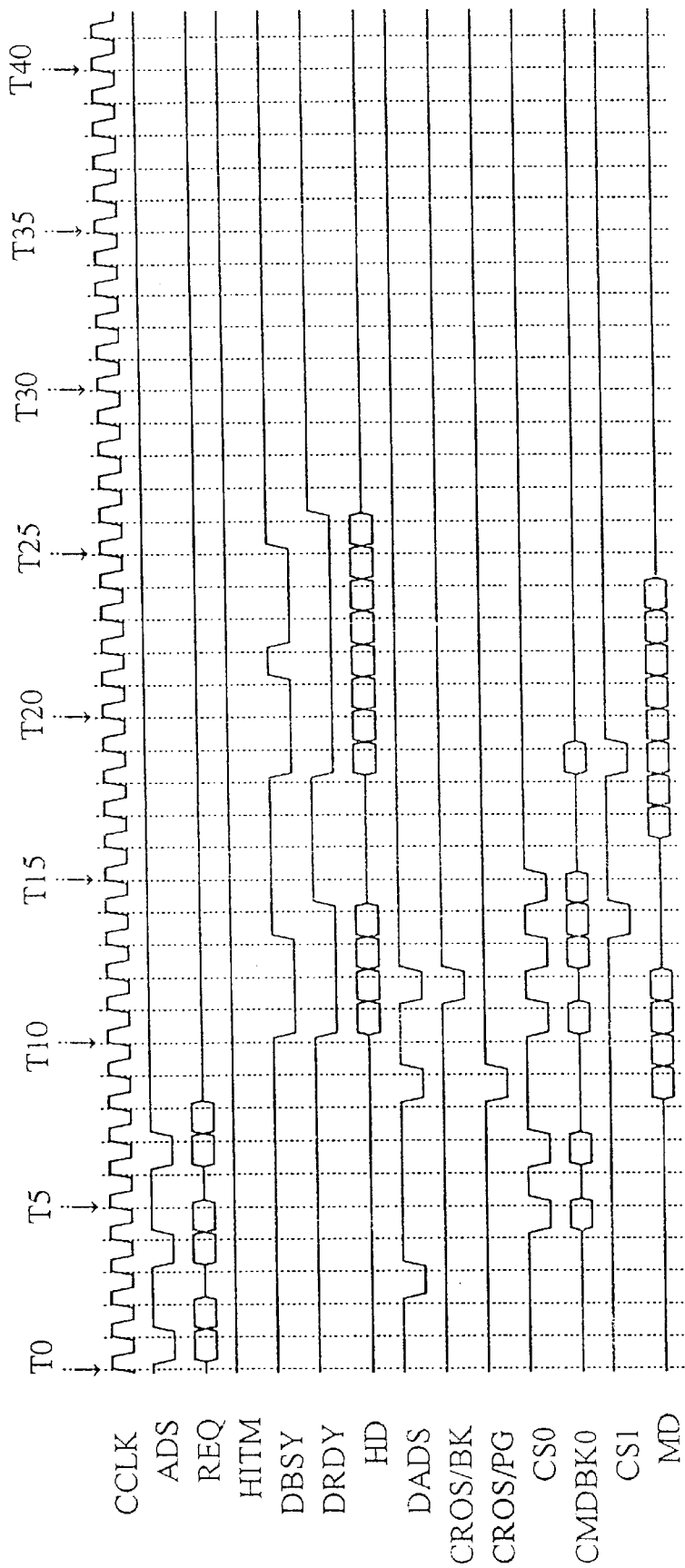

Timing diagrams shown in FIGS. 9A and 9B are waveforms that derive from using DIMMs. In the first data request issued by the CPU 110, the requested data resides on the starling page of the memory bank 140. Data requested by the second data request of the CPU 110 also resides in the same memory bank 140 but not on the starting page. Data requested by the third data request of the CPU 110 resides on the starting page of another memory bank 141 on a starting page.

In the conventional timing diagram as shown in FIG. 9A, the CPU 110 sends out ADS and REQ data accesssignals in cycles T1, T4 and T7, respectively. If the first data access request signal is nor a write-back request signal, two cycles after the CPU 110 sends out the first data access request signal, the CPU interface circuit 121 emits an internal data access request signal via the DADS line to the memory controlling circuit 122. After the CPU 110 sends out the second data access request, the CPU interface circuit 121 must wait for some time just to be sure that the HITM signal line is not activated. Hence, the CPU interface circuit 121 does not send a signal down the signal line DADS to the memory controlling circuit 122 until cycle T9 is reached. By a similar argument, the third internal data request does not send a signal down the signal line DADS until cycle T12 is reached.

After receiving the first data access request from the CPU interface circuit 121, the memory controlling circuit 122 sends out an activating signal and a read instruction to the memory bank 140 via signal lines CS0 and CMDBK0 in cycles T5 and T7. After another two cycles, four sets of data are returned by the memory cluster via data lines MD starting in cycle T9.

Although the memory controlling circuit 122 has already received the second data request from the CPU interface circuit 121 by cycle T9, a pre-charging signal, an activating signal and a read instruction are not sent to the memory bank 140 via the signal lines CS0 and CMDBK0 until the second-to-last set of data is transferred from the memory cluster 130 to the CPU 110 in cycle T11. A few more cycles later, starting in cycle T17, four more sets of data are returned by the memory cluster 130.

Similarly, after the memory controlling circuit 122 picks up the third data access request signal from the CPU interface circuit 121, CS1 and CMDBK0 signal lines do not send forward a pre-charge signal, an activating signal and a read instruction to memory bank 141 until the second-to-last set of data is transferred from the memory cluster 130 to the CPU 110 in cycle T19. After four more cycles, four more sets of data are returned by the memory cluster in cycle T23.

In the timing diagram as shown in FIG. 9B, the CPU 110 sends out ADS and REQ data access request signals in cycles T1, T4 and T7, respectively. If the first data access request signal, two cycles after the CPU 110 sends out the first data access request signal, the CPU interface circuit 221 emits an internal data access request signal via the DADS line to the memory controlling circuit 222. After the CPU 110 sends out the second data access request, the CPU interface circuit 221 must wait for some time just to be sure that the HITM signal line is not activated. Hence, the CPU interface circuit 221 does not send a signal down the signal line DADS to the memory controlling circuit 222 until cycle T9 is reached. Although the requested data in the second data request of CPU 110 resides in the same memory bank 140, the data are on a different page. Hence, a cross memory page signal also is sent by the CPU interface circuit 221 through the CROS/PG signal lines. By a similar argument, the third internal data request does not send a signal down the signal line DADS until cycle T12 is reached. Since the requested data now resides in a different memory bank 141, a cross memory bank signal has to be submitted via the signal line CROS/BK, as well.

After receiving the first data access request from the CPU interface circuit 221, the memory controlling circuit 222 sends out an activating signal and a read instruction to the memory bank 140 via the signal lines CS0 and CMDBK0 in cycles T5 and T7. After another two cycles, four sets of data are returned by the memory cluster 130 via data lines MD starting in cycle T9.

When the memory controlling circuit 222 processes the first data read request, since different memory pages in the same memory bank needs to be accessed in the second data read request, the memory cluster 130 must wait until the second-to-last set of data is out. Therefore, a pre-charging signal, an activating signal and a read instruction are not sent via the signal lines CS0 and CMDBK0 until cycle T11 arrives. After two more cycles starting in cycle T17, four more sets of data are returned by the memory cluster 130.

Similarly, the data required by the third data access request of the CPU 110 resides in another memory bank. Hence, as soon as the third data access request is received, a pre-charge signal, an activating signal and a read instruction are issued to the memory bank 141 via the signal lines CS1 and CMDBK0 in the next cycle T13. However, the second data access request has to wait until the end of cycle T19 for the read instruction to reach the memory bank 141. After two more cycles starting in cycle T21, four sets of data are returned by the memory cluster 130.

As shown in FIG. 9A, a conventional data accessing and controlling unit requires a total of 29 clock cycles to complete the entire operation from the sending of three consecutive data access requests to the return of all the necessary data to the CPU 110 via signal lines HD. In comparison, the data accessing and controlling unit of this invention only requires only 26 clock cycles as shown in FIG. 9B.

Figure 10A:
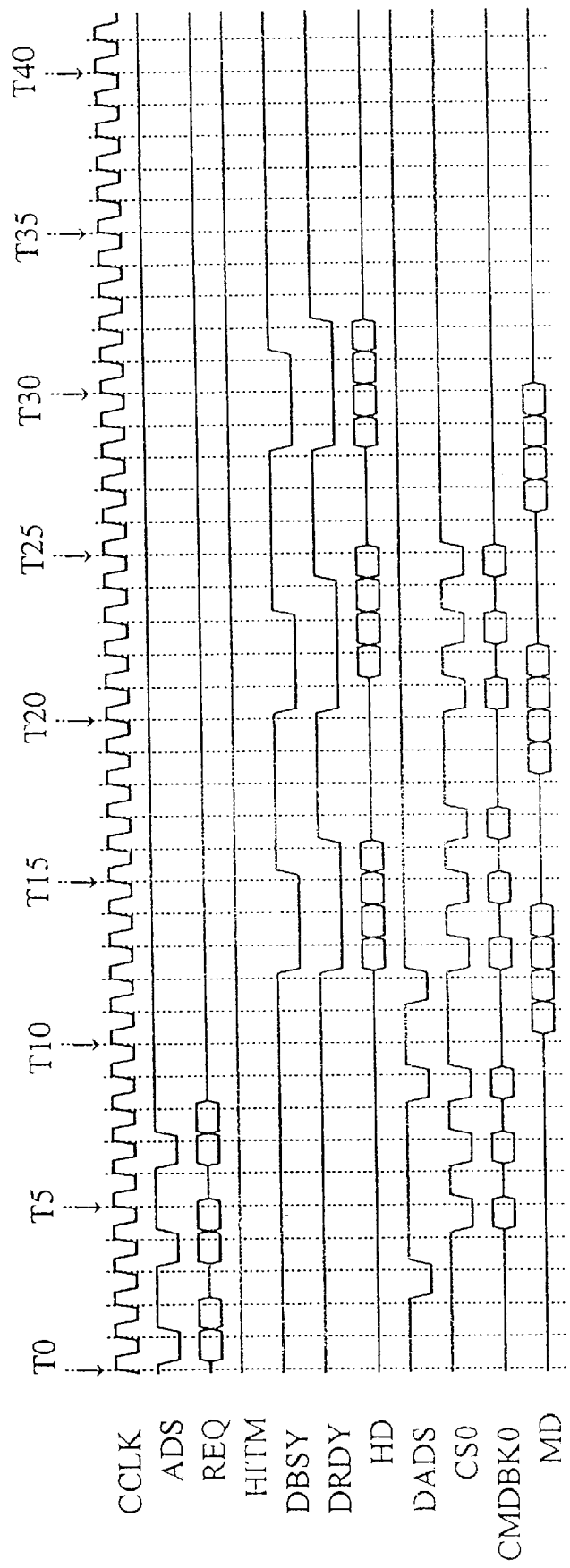
Figure 10B:
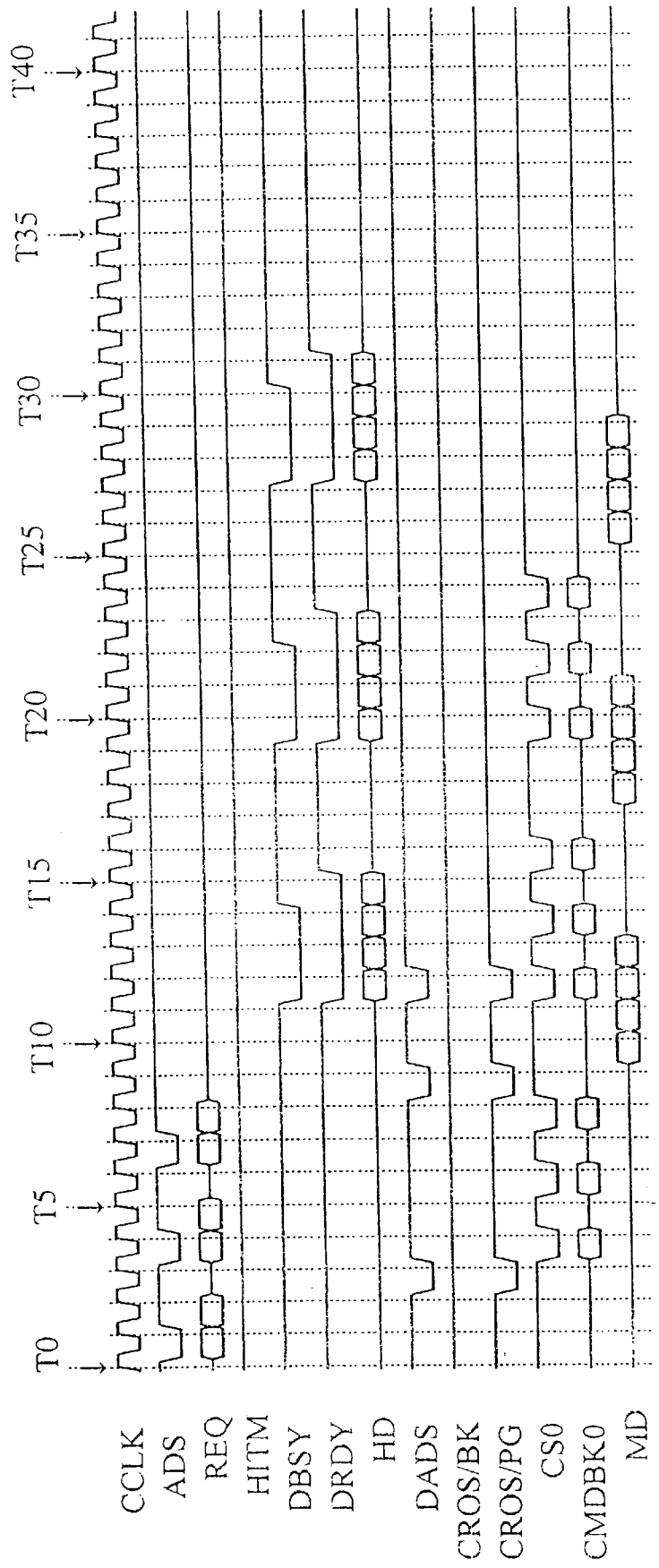

Timing diagrams shown in FIGS. 10A and 10B are waveforms that derive from using SIMMs. In the first data request issued by the CPU 110, the requested data resides in the memory bank 140. However, a memory page has to be closed off first and then a new page has to be opened. Data requested by the second data request of the CPU 110 also resides in the same memory bank 140 but on a different page. Data requested by the third data request of the CPU 110 are in the same memory bank 140 but the data is on yet another page.

In the conventional timing diagram as shown in FIG. 10A, the CPU 110 sends out ADS and REQ data access request signals in cycles T1, T4 and T7, respectively. If the first data access request signal is not a write-back request signal, two cycles after the CPU 110 sends out data read signal, the CPU interface circuit 121 emits an internal data access request signal via the DADS line to the memory controlling circuit 122. After the CPU 110 sends out the second data access request, the CPU interface circuit 221 must wait for some time just to be sure that the HITM signal line is not activated. Hence, the CPU interface circuit 121 does not send a signal down the signal line DADS to the memory controlling circuit 122 until cycle T9 is reached. By a similar argument, the third internal data request does not send a signal down the signal line DADS until cycle T12 is reached.

After receiving the first data access request from the CPU interface circuit 121, the memory controlling circuit 122 sends out an activating signal and a read instruction the memory bank 140 via signal lines CS0 and CMDBK0 in cycles T5, T7 and T9. Two cycles later, starting in cycle T11, four sets of data are returned by the memory cluster 130 via data lines MD.

Although the memory controlling circuit 122 has already received the second data request from the CPU interface circuit 121 by cycle T9, a pre-charging signal, an activating signal and a read instruction are not sent to the memory bank 140 via the signal lines CS0 and CMDBK0 until the second-to-last set of data is transferred from the memory cluster 130 to the CPU 110 in cycle T13. Starting in cycle T19, another four sets of data are returned by the memory cluster 130.

Similarly, after the memory controlling circuit 122 picks up the third data access request signal from the CPU interface circuit 121, CS0 and CMDBK0 signal lines do not send forward a pre-charge signal, an activating signal and a read instruction to memory bank 140 starting until the second-to-last set of data is transferred from the memory cluster 130 in cycle T21. After two more cycles, the memory cluster 130 returns four sets of data starting in cycle T27.

In the timing diagram as shown in FIG. 10B, the CPU 110 sends out ADS and REQ data access request signals in cycles T1, T4 and T7, respectively. If the first data access request signal is not a write-back request signal, two cycles after the CPU 110 sends out the first data access request signal, the CPU interface circuit 221 emits an internal data access request signal and a cross memory page signal to the memory controlling circuit 222 via the signal lines DADS and CROS/PG. After the CPU 110 sends out the second data access request, the CPU interface circuit 221 must wait for some time just to be sure that the HITM signal line is not activated. Hence, the CPU interface circuit 221 does not send a signal down the signal line DADS to the memory controlling circuit 222 until cycle T9 is reached. Although the requested data in the second data request of CPU 110 resides in the same memory bank 140, the data are on a different page. Hence, a cross memory page signal is submitted by the CPU interface circuit 221 through the signal lines CROS/PG. By a similar argument, the third internal data request sends a signal down the signal line DADS until cycle T12 is reached. Since the requested data resides in the same memory bank 140 but on a different memory page, a cross memory page signal has to be sent via the CROS/PG line as well.

One cycle after receiving the first data access request and the cross memory page signal from the CPU interface circuit 221, in other words, starting in cycle T4, the memory controlling circuit 222 sends out a pre-charge signal, an activating signal and a read instruction to the memory bank 140 via the signal lines CS0 and CMDBK0. After another two cycles, four sets of data are returned by the memory cluster 130 via data lines MD starting in cycle T11.

When the memory controlling circuit 222 processes the first data read request, since different memory pages in the same memory bank needs to be accessed in the second data read request, the memory cluster 130 must wait until the second-to-last set of data is out. Therefore, a pre-charging signal, an activating signal and a read instruction are not submitted to the signal lines CS0 and CMDBK0 until cycle T12 arrives. After one more cycle starting in cycle T18, four more sets of data are sent out from the memory cluster 130.

Similarly, data requested by the third data access request are in the same memory bank 140 but on a different memory page. As soon as the third data access request is received, a pre-charge signal, an activating signal and a read instruction are issued to the memory bank 140 via the signal line CS0 and CMDBK0 starting in cycle T20. After two more cycles starting in cycle T26, four sets of data are returned to the CPU 110 from the memory cluster 130.

As shown in FIG. 10A, a conventional data accessing and controlling unit requires a total of 32 clock cycles to complete the entire operation from the sending of three consecutive data access requests to the return of all the necessary data to the CPU 110 via signal lines HD. In comparison, the data accessing and controlling unit of this invention requires only 30 clock cycles as shown in FIG. 10B.

Due to the pre-charging and activating of a new memory page, the cross memory bank and cross memory page data accessing and controlling unit of this invention is capable of accessing data in other, different memory banks and page areas before the completion of previous data access operations. Hence, when the CPU issues a series of consecutive data read requests for data residing in different memory banks or different pages, the CPU interface circuit can simultaneously issue cross memory page and cross memory bank signals, in addition to the internal data request signals. By opening up the required pages in a memory bank beforehand, cycle times are saved, thereby increasing the efficiency of the entire computer system.

In summary, the cross memory bank and cross memory page data accessing and controlling unit of this invention are able to shorten the overall processing time needed to process a sequence of data access requests from a CPU. By opening up a new page in a memory bank a few cycles ahead of time, a few cycles of operating time are saved compared with a conventional controlling unit. Therefore, an operating efficiency of the entire computer system can be improved because of the controlling unit.

It is apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A cross memory bank, cross memory page data accessing and controlling unit for coupling to a CPU and a memory cluster such that the memory cluster has a plurality of memory banks and each memory bank has a plurality of memory pages, and the CPU is able to access data in the memory cluster through the data accessing and controlling unit, comprising:

a CPU interface circuit that couples to the CPU for receiving a CPU data access request and then sending out an internal data access request signal, such that when the CPU submits consecutive requests for data in different memory banks, the CPU interface circuit submits a cross memory bank signal together with the internal data access request, and when the CPU submits consecutive requests for data in different memory pages, the CPU interface circuit submits a cross memory page signal together with the internal data access request; and a memory controlling circuit that couples to the CPU interface circuit and the memory cluster for receiving the internal data access request and associated controlling signals, such that when a cross memory bank or a cross memory page signal is received along with the internal data access request, the page within the memory bank where the requested data resides is opened immediately.

2. The controlling unit of claim 1, wherein the CPU interface circuit further includes an address register for storing address information regarding the memory banks and memory pages within the memory cluster so that the CPU interface circuit can determine the proper occasion for sending out cross memory bank and cross memory page signals.

3. The controlling unit of claim 2, wherein the address information within the address register regarding memory banks and memory pages of the memory cluster is updated repeatedly by the memory controlling circuit.

4. The controlling unit of claim 1, wherein consecutive data access requests include reading sets of data from the memory cluster.

5. A cross memory bank, cross memory page data accessing and controlling unit for coupling to a CPU and a memory cluster, such that the memory cluster has a plurality of memory banks and each memory bank has a plurality of memory pages, and the CPU is able to access data in the memory cluster through the data accessing and controlling unit, comprising:

a CPU interface circuit that couples to the CPU for receiving a CPU data access request and then sending out an internal data access request signal, such that when the CPU submits consecutive requests for data in different memory banks, the CPU interface circuit submits a cross memory bank signal together with the internal data access request signal, and when the CPU submits consecutive requests for data in different memory pages, the CPU interface circuit submits a cross memory page signal together with the internal data access request signal;

a memory controlling circuit that couples to the CPU interface circuit and the memory cluster for receiving the internal data access request signal and associated controlling signals, such that when a cross memory bank or a cross memory page signal is received along with the internal data access request signal, the page within the memory bank where the requested data resides is opened immediately; and an address register for storing address information regarding the memory banks and memory pages within the memory cluster so that the CPU interface circuit can determine the proper occasion for sending out cross memory bank and cross memory page signals.

6. The controlling unit of claim 5, wherein information within the address register regarding memory banks and memory pages of the memory cluster is updated repeatedly by the memory controlling circuit.

7. A method for controlling cross memory bank, cross memory page data access that can be used together with a CPU for accessing data in a memory cluster, wherein each memory cluster has a plurality of memory banks and each memory bank has a plurality of memory pages, comprising the steps of:

sending out a series of data access requests from the CPU;

sending out a series of internal data access requests according to the data access requests submitted by the CPU;

sending out a cross memory bank signal along with the internal data access request whenever the data in consecutive requests lie in different memory banks; and sending out a cross memory page signal along with the internal data access request whenever the data in consecutive requests lie in the same memory bank but on a different page.

8. The controlling method of claim 7, wherein the method further includes the steps of:

providing a memory controlling circuit for receiving an internal data request signal and associated controlling signals; and opening up the page in the memory bank required by the CPU when the memory controlling circuit receives the internal data request signal and also receives a cross memory bank signal or a cross memory page signal.

* * * * *